(12) United States Patent
Breeuwer et al.

(10) Patent No.: US 7,912,260 B2
(45) Date of Patent: Mar. 22, 2011

(54) MULTI-COMPONENT VESSEL SEGMENTATION

(75) Inventors: Marcel Breeuwer, Eindhoven (NL); Silvia Delgado Olabarriaga, Utrecht (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 966 days.

(21) Appl. No.: 11/719,959

(22) PCT Filed: Nov. 24, 2005

(86) PCT No.: PCT/IB2005/053887
§ 371 (c)(1),
(2), (4) Date: May 23, 2007

(87) PCT Pub. No.: WO2006/056954
PCT Pub. Date: Jun. 1, 2006

(65) Prior Publication Data
US 2007/0297561 A1 Dec. 27, 2007

(30) Foreign Application Priority Data
Nov. 29, 2004 (EP) .................................. 04106135

(51) Int. Cl.
*G06K 9/00* (2006.01)
(52) U.S. Cl. ....................................... 382/128; 382/276
(58) Field of Classification Search .................. 382/128, 382/276
See application file for complete search history.

(56) References Cited

U.S. PATENT DOCUMENTS
5,825,908 A 10/1998 Pieper et al.
2001/0031920 A1 10/2001 Kaufman et al.

OTHER PUBLICATIONS

Olabarriaga et al: "Segmentation of Abdominal Aortic Aneurysms With a Mon-Parametric Appearance Model"; Lecture Notes in Computer Science, Springer-Verlag, vol. 3117, Jan. 2004, pp. 257-268, XP007900689.
Larralde et al: "Evaluation of a 3D Segmentation Software for the Coronary Characterization in Multi-Slice Computed Tomography"; Lecture Notes in Computer Science, Springer-Verlag, Col. 2674, 2003, pp. 39-51, XP007900693.
Subasic et al: "Region-Based Deformable Model for Aortic Wall Segmentation"; Image and Signal Processing and Analysis, 2003 Proceedings of the 3rd Intl. Symposium, Rome, Italy Sep. 18-20, 2003, USA, IEEE, vol. 2, pp. 731-735, XP010704794.
De Bruijne et al: "Interactive Segmentation of Abdominal Aortic Aneurysms in CTA Images"; ARCHIVE.CS.UU.NL/PUB/RUU/CS/TECHREPS/CS-2003/2003-011.PDF.
Wink et al: "Fast Delineation and Visualization of Vessels in 3-D Angiographic Images"; IEEE Transactions on Medical Imaging, vol. 19, No. 4 Apr. 2000, pp. 337-346.
Loncaric et al: "3-D Deformable Model for Aortic Aneurysm Segmentation From CT Images." Faculty of Electrical Engineering and Computin, Department of Electronic Systems and Information Processing, University of ZGREB, ZGREB, Croatia, Article Retrieved From IPG.ZEOI.ER.HR/PAPERS/WC00AN.PDF Aorta Segmentation.
Kovacevic et al: "Deformable Contour Based Method for Medical Image Segmentation"; Faculty of Electrical Engineering and Computing, University of ZAGREB, ZGREB, Croatia, Article Retrieved From IPG.ZESOI.FER.HR/PAPERS/ITI99AN.PDF.
Cootes et al: "The Use of Active Shape Models for Locating Structures in Medical Images"; Image and Vision Computing, vol. 12, No. 6, Jul. 1994, pp. 355-366.
Giachetti et al: "Reconstruction and Web Distribution of Measurable Arterial Models"; Medical Image Analysis Mar. 7, 2003, pp. 79-93.
Subasic et al: "3-D Image Analysis of Abdominal Aortic Aneurysm"; SPIE Medical Imaging:Image Processing, vol. 4684, 2002, pp. 1681-1689.

*Primary Examiner* — John B Strege

(57) ABSTRACT

A method and Computer Program Product for segmenting a three-dimensional digital representation of an anatomical structure, in which a temporary replacement of intensity values is performed in a specified volume with a substitute intensity value corresponding to healthy anatomical structure. The segmentation of an outer boundary of the blood vessel is performed, before the original intensity values are restored. After restoration of the original intensity values, a thorough segmentation of the specified volume and any lesions contained therein is performed.

15 Claims, 3 Drawing Sheets

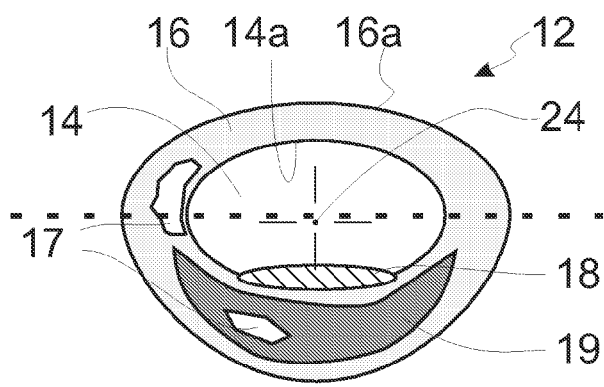
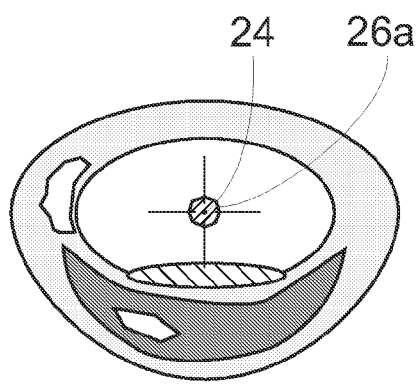
Fig. 2A  Fig. 2B
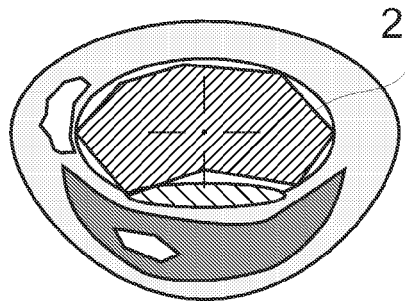
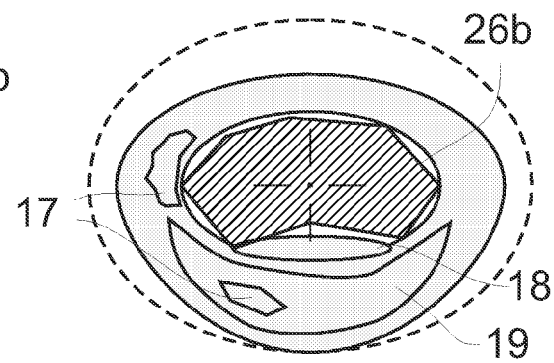
Fig. 2C  Fig. 2D
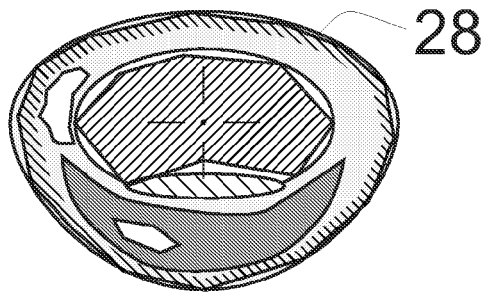
Fig. 2E

MULTI-COMPONENT VESSEL SEGMENTATION

The present invention relates to the segmentation of structures in digitized scans acquired by a radiological method such as Computed Tomography Angiography (CTA). More specifically, the present invention relates to the segmentation of anatomical structures such as blood vessels into their constituents for subsequent visualization and measurement.

Segmentation of anatomical structures such as a blood vessel finds particular application in many areas of cardiovascular medicine, in which it is required to visualize a diseased vessel, to determine which components it consists of (e.g. lumen, thrombus, wall, calcifications, plaques) and to accurately derive parameters for each of these components (shape, size, diameter, area, volume, etc.). While a blood vessel without pathological findings can be assumed to consist of a lumen (the perfused part) and a healthy wall (the unperfused part), a pathological blood vessel usually shows additional anatomical structures. The abdominal aorta will be used as an example. In elderly men, a life-threatening aneurysm may develop in this part of the aorta (abdominal aortic aneurysm or briefly AAA). To visualize, characterize, and quantify AAAs, it is required to segment all relevant components: lumen (blood), thrombus (clots inside the blood against the wall), healthy wall, and diseased wall (with plaques and/or calcifications inside).

While several methods for lumen segmentation and tracking are reported in the literature (e.g. "Fast delineation and visualization of vessels in 3-D angiographic images" by O. Wink et al., IEEE TMI, 19 (4): 337-346, April 2000; "Reconstruction and web distribution of measurable arterial models" by M. Toveri et al., Medical Image Analysis, 7 (1): 79-93, March 2003), only a few researchers have addressed the more complex issue of thrombus and wall segmentation. Due to the low contrast between thrombus, wall and surrounding tissue in CTA images, segmentation methods have difficulty in delineating the correct boundary. Image-gradient-based approaches often fail because strong responses from neighboring objects, such as the spine and lumen, distract the method from finding the correct boundary. Threshold-based approaches are also prone to fail, since the same intensity value is found inside the thrombus and in the neighboring structures.

A few attempts to segment the thrombus have been reported in the literature. A method proposed in "3-D Image Analysis of Abdominal Aortic Aneurysm" by M. Subasic et al., published in "SPIE Medical Imaging—Image Processing", pages 1681-1689. SPIE, 2002, is based on the so-called level-based technique. It starts from a sphere positioned by a user inside the lumen, which is used as an initialization for a deformable model that segments the lumen, using image gradient as an image feature. This result is used to initialize the segmentation method for the thrombus and the outer boundary of the blood vessel. The described segmentation method uses specific image features derived from a pre-processing step (threshold, morphological operations, and image gradient). However, the reported results do not seem sufficiently accurate. This and other of the earlier proposed methods to segment vessel components other than the lumen often fail due to the fact that conventional segmentation approaches do not take prior knowledge of the potential shapes and appearances (pixel intensities) of the vessel and its surroundings into account. These described problems appear also in the segmentation of other anatomical structures, such as the brain or the liver.

Accordingly, it is an object of the present invention to provide a method and a Computer Program Product for accurate segmentation of all relevant components of an anatomical structure.

In a preferred embodiment of the present invention, a method of segmenting a three-dimensional digital representation of an anatomical structure is disclosed. The method comprises:

segmentation of an outer boundary of the anatomical structure;

temporary replacement, prior to the segmentation of the outer boundary and in a specific volume, of intensity values significantly deviating from those of the anatomical structure with a substitute intensity value representative of the anatomical structure;

restoration of the significantly deviating intensity values once the segmentation of the outer boundary is complete.

The proposed method has the advantage that the segmentation of the outer boundary of the anatomical structure is not disturbed by e.g. lesions in the specified volume, caused by strongly differing intensity values of such lesions as compared with those of the healthy anatomical structure. These disturbing anatomical structures are relatively easily identified by verification of two conditions. Considering a blood vessel as the anatomical structure to be segmented, having a lumen, a wall, and possibly lesions such as calcifications, a thrombus, and/or plaques, the first condition concerns the spatial relationship of the outer boundary of the wall with respect to the lumen outer boundary. In the case of an AAA, in which the wall of a blood vessel is thickened, the wall outer boundary encloses the lumen outer boundary and is contained within a limited volume. In other words, the presence of the wall of the blood vessel may be assumed with a sufficiently high probability within a certain radial distance from the lumen outer boundary. The second condition helping in determining disturbing anatomical structures within the region of the blood vessel situated between the lumen outer boundary and the wall outer boundary concerns the range of the encountered intensity values. The disturbing anatomical structures may show intensity values in a scan of a radiology method, e.g. CTA, that strongly differ from the intensity values of a healthy wall. The combination of the two conditions yields a reliable indicator for regions around the lumen outer boundary of a blood vessel that are actually disturbing anatomical structures. Having identified these disturbing anatomical structures, the temporary replacement of their intensity values with intensity values that correspond to those of a healthy blood vessel wall eliminates their strong influence on any method and/or algorithm used for the segmentation of the outer boundary of the wall. The disturbing anatomical structures are therefore regarded, during the segmentation of the wall outer boundary, as a part of the wall of the blood vessel. After the segmentation has been done, those intensity values that were replaced may be restored in order to reflect the disturbing anatomical structures between the lumen outer boundary and the wall outer boundary and to perform a segmentation on these disturbing anatomical structures.

In a related embodiment of the invention, the specified volume is determined by through determination of an envelope of the anatomical structure. The envelope may be determined in a generous manner to make sure that the entire outer boundary of the anatomical structure is enclosed in the envelope.

In a further embodiment, the specified volume is determined by a boundary layer surrounding the anatomical structure. Some anatomical structures are located within another anatomical structure surrounding the former. In these cases, the boundary layer that is defined by the surrounding anatomical structure can also be used as a boundary for the specified volume. This is advantageous if the surrounding anatomical structure can be easily identified because of e.g. a typical range of intensity values.

In a related embodiment, the substitute intensity value is automatically obtained by evaluation of intensity statistics in a specified volume, e.g. a shell around the segmented outer lumen boundary in the particular case of a blood vessel. This may be achieved, for example, by, among others, determining the mean or the most frequently occurring pixel value. The automatic determination of the substitute intensity value that is representative of a healthy wall reduces user interaction. The method becomes faster and more reproducible, for example for comparative clinical trials or long-term analysis.

In a further embodiment of the present invention, lesions in the specified volume are individually segmented subsequent to the restoration. In addition to true lesions, disturbing anatomical structures within the anatomical structure to be segmented, which are not necessarily pathological, can also be treated in this manner. Performing this step after the restoration of the intensity values, which had been previously replaced, ensures that a proper segmentation of lesions within the specified volume is possible. The medical practitioner will be mostly interested in the anatomical structures within this region. Therefore, in the particular case of a blood vessel, limiting the volume of interest (VOI) to a hollow cylinder-like shape defined by the lumen outer boundary and the wall outer boundary available from the preceding segmentation steps facilitates the task of segmenting structures in this region of the blood vessel. In the particular case of a blood vessel segmentation, these anatomical structures may be calcifications. Calcifications disturb the segmentation of the wall outer boundary of the blood vessel very strongly. Fortunately, the intensity values of calcifications are always in a certain, rather limited range (actually above a certain value). They can therefore be easily identified and replaced by values that are more equal to those of a healthy wall. Still, the anatomical structures may also be plaques in the particular case of a blood vessel. For certain radiology methods, certain plaque types may be the disturbing factor. In particular, certain plaque types appear brighter than healthy wall in Magnetic Resonance Imaging (MRI). Accordingly, plaques may be dealt with in a similar manner as calcifications.

In a further embodiment, the digital representation is obtained from a radiology method. Radiology methods allow non-invasive acquisition of data from the interior of the body of a patient. Furthermore, their resolution may be sufficiently fine for the acquisition of structures within the anatomical structure.

In a related embodiment, the radiology method is one of Computed Tomography Angiography (CTA) or Magnetic Resonance Imaging (MRI). CTA and MRI each have attributes that may make the one or the other more suitable for use on certain patients. CTA is more widely available, faster, and has a better spatial resolution than MRI. The last advantage is especially important for visualizing calcification. MRI, on the other hand, can visualize an arterial lumen without contrast agents, although contrast agents may be used for enhanced contrast, as well. Furthermore, MRI does not use ionizing radiation.

In a further embodiment of the present invention, the anatomical structure is one of a blood vessel, a brain or a liver. These parts of the human body are well suited for the application of a method according to the present invention. In the particular case of a blood vessel, the lumen is segmented first. Once the size of the blood vessel has been determined, the specified volume, in which replacement of intensity values is to be performed, can be determined, e.g. based on the diameter of the lumen indicating a more or less thick blood vessel. The brain is also well suited for the method according to the invention, since the skull provides a natural, easily detectable boundary for the specified volume. If the organ to be segmented is the liver, the boundary of the specified volume around the liver can be determined by e.g. consulting a different radiology method first and incorporating the result in the method of the present invention.

In another preferred embodiment of the present invention, a Computer Program Product for segmenting a three-dimensional digital representation of an anatomical structure is performed. The Computer Program Product performs the steps of:

segmentation of an outer boundary of a the anatomical structure;

temporary replacement, prior to the segmentation of the outer boundary and in a specific volume, of intensity values significantly deviating from those of the anatomical structure with an intensity value representative of the anatomical structure;

restoration of the significantly deviating intensity values once the segmentation of the anatomical structure outer boundary is complete.

The proposed Computer Program Product has the advantage that the segmentation of the outer boundary of the anatomical structure is not disturbed by any lesions inside the region of the anatomical structure that is delineated by the specified volume, caused by the strongly differing intensity values of these structures compared with those of the anatomical structure. These lesions or disturbing anatomical structures are relatively easily identified by verification of two conditions. In the particular case of a segmentation of a blood vessel, having a lumen, a wall, and possibly lesions such as calcifications, a thrombus, or plaques, the first condition concerns the spatial relationship of the wall outer boundary with respect to the lumen outer boundary. In the case of an AAA, in which the wall of a blood vessel is thickened, the outer boundary encloses the lumen outer boundary and is contained within a limited volume. In other words, the presence of the wall of the blood vessel may be assumed with a sufficiently high probability within a certain radial distance from the lumen outer boundary. The second condition helping in determining disturbing anatomical structures within the blood vessel wall concerns the range of the encountered intensity values. The disturbing anatomical structures may show intensity values in a scan of a radiology method, e.g. CTA, that strongly differ from the intensity values of a healthy wall. The combination of the two conditions yields a reliable indicator for regions around the lumen outer boundary of a blood vessel that are actually anatomical structures disturbing an efficient segmentation of the wall outer boundary. Having identified these disturbing anatomical structures, the temporary replacement of their intensity values with intensity values that correspond to those of a healthy blood vessel wall eliminates their strong influence on any method and/or algorithm used for the segmentation of the outer boundary of the wall. The disturbing anatomical structures are therefore regarded, during the segmentation of the wall outer boundary, as a part of the wall of the blood vessel. After the segmentation has been completed, those pixel intensities that were replaced may be restored in order to reflect the disturbing anatomical structures within the blood vessel wall. Besides these advantages, a Computer Program Product is adapted to instruct a processor to perform the steps defined by the Computer Program Product in order eventually to obtain a representation of the segmented components of the anatomical structure in a memory connected to the processor.

In a related embodiment of the invention, the specified volume is determined by determining an envelope of the anatomical structure. The envelope may be determined in a generous manner to make sure that the entire outer boundary of the anatomical structure is enclosed in the envelope.

In a further embodiment, the specified volume is determined by a boundary layer surrounding the anatomical structure. Some anatomical structures are located within another anatomical structure surrounding the former. In these cases, the boundary layer that is defined by the surrounding anatomical structure can also be used as a boundary for the specified volume. This is advantageous if the surrounding anatomical structure can be easily identified because of e.g. a typical range of intensity values.

In a related embodiment, the substitute intensity value is automatically obtained by evaluation of intensity statistics in the specified volume. This can be achieved by determining the mean or the most frequently occurring pixel value, among other means. The automatic determination of the substitute intensity value that is representative of a healthy wall reduces user interaction. The method becomes faster and more reproducible, for example for comparative studies or long-term analysis.

In a further embodiment, lesions in the specified volume are individually segmented. Performing this step after the restoration of the intensity values that had been replaced ensures that a proper segmentation of the lesions within the specified volume is possible. The medical practitioner will be mostly interested in the anatomical structures within this region of the blood vessel. Therefore, in the particular case of blood vessel, limiting the volume of interest (VOI) to a hollow cylinder defined by the lumen outer boundary and the wall outer boundary available from the preceding segmentation steps facilitates the task of segmenting structures within the region that the medical practitioner is interested in. In the particular case of a blood vessel, the anatomical structures may be calcifications. Calcifications disturb the segmentation of the outer boundary very strongly. Fortunately, the intensity values of calcifications are always in a certain, rather limited range (actually above a certain value). They can therefore be easily identified and replaced by values that are more equal to those of the thrombus. Still, the anatomical structures may be plaques in the particular case of a blood vessel. For certain radiology methods, certain plaque types may be the disturbing factor. In particular, certain plaque types appear brighter than healthy wall in Magnetic Resonance Imaging (MRI). Accordingly, plaques may be dealt with in a similar manner as calcifications.

In a further embodiment of the present invention, the three-dimensional digital representation is obtained from a radiology method. Radiology methods allow non-invasive acquisition of data from the interior of the body of a patient. Furthermore, their resolution may be sufficiently fine for the acquisition of structures within the anatomical structure.

In a related embodiment, the radiology method is one of Computed Tomography Angiography (CTA) or Magnetic Resonance Imaging (MRI). CTA and MRI each have attributes that may make the one or the other more desirable for application to certain patients. CTA is more widely available, faster, and has a better spatial resolution than MRI. The last advantage is especially important for visualizing calcification. MRI, on the other hand, can visualize an arterial lumen without contrast agents. Furthermore, MRI does not use ionizing radiation.

In a further embodiment of the present invention, the anatomical structure is one of a blood vessel, a brain or a liver. These parts of the human body are well suited for a Computer Program Product according to the present invention. In the particular case of a blood vessel, the lumen is segmented first. Once the size of the blood vessel has been determined, the specified volume, in which replacement of intensity values is to be performed, can be determined, e.g. based on the diameter of the lumen indicating a more or less thick blood vessel. The brain is also well suited for the method according to the invention, since the skull provides a natural, easily detectable boundary for the specified volume. If the organ to be segmented is the liver, the boundary of the specified volume around the liver can be determined by e.g. consulting a different radiology method first and incorporating the result in the Computer Program Product of the present invention.

These and other objects and features of the present invention will be more fully disclosed or rendered obvious by the following detailed description of the preferred embodiments of the invention, which is to be considered together with the accompanying drawings wherein like numbers refer to like parts. In the drawings:

FIG. 2A-FIG. 2E are axial slices of the blood vessel of FIG. 1 along a slice plane II-II during different steps of a method according to the invention;

Figure 1:
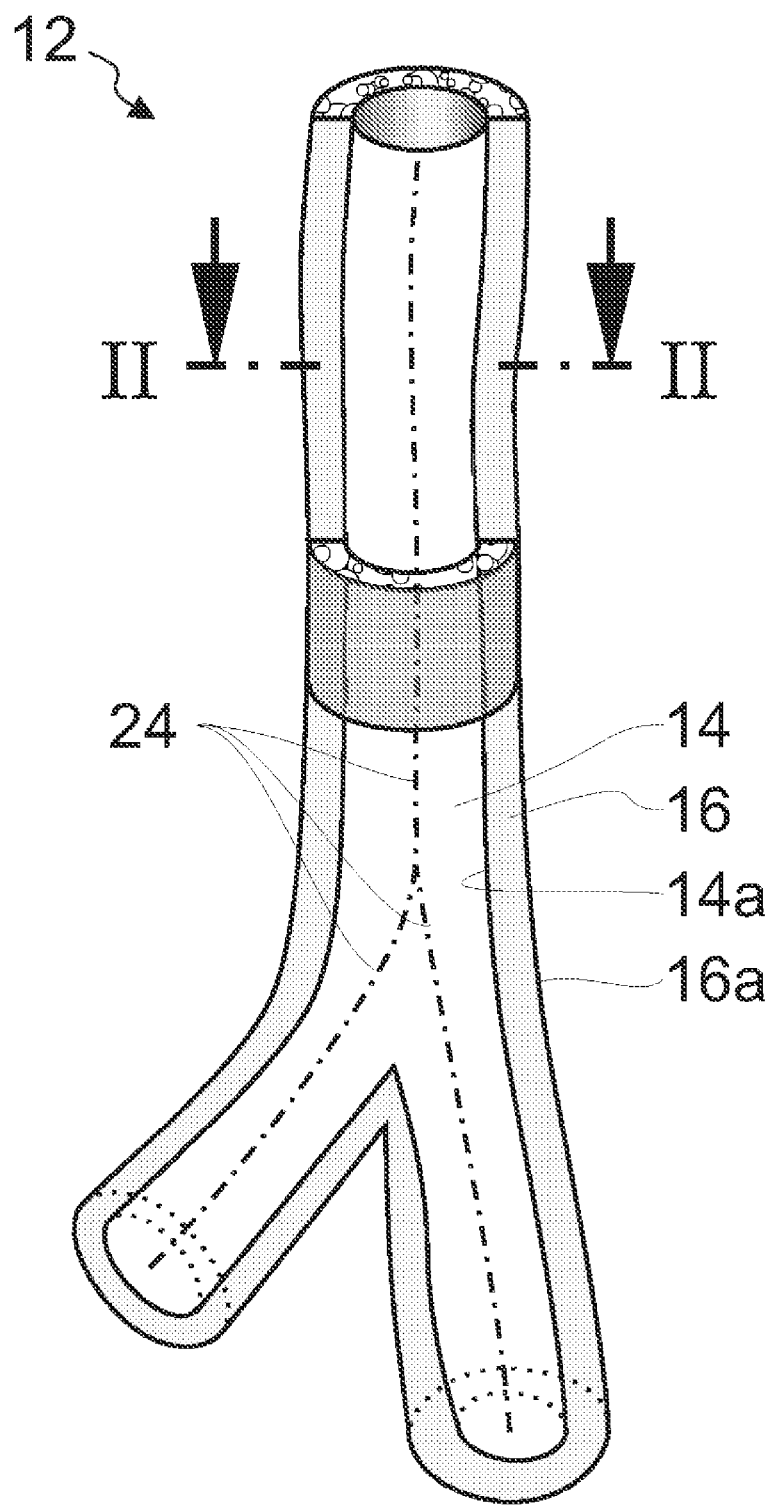
FIG. 1 is a perspective view of the bifurcation of a blood vessel.

FIG. 1 shows a blood vessel, more particularly a bifurcation of a blood vessel. The blood vessel 12 comprises a lumen 14 and a wall 16. The lumen 14 is the perfused part of the blood vessel, e.g. the part in which the blood flows. The lumen 14 is delineated by a lumen outer boundary 14a. A wall outer boundary 16a delineates the blood vessel against surrounding tissue. The upper half of wall 16 is shown only partly in order to make the lumen 14 better visible. A centerline 24 is calculated during execution of the method. Centerline 24 acts as an auxiliary tool during the execution of the method and provides an axis of reference for subsequent operations. The centerline can be determined between two user-defined or automatically determined points, a starting point and an end point. In the represented case of a bifurcation, the centerline may be composed of two branches. It should be noted that the centerline, despite its name, does not necessarily have to be central to the lumen or located inside it, since the subsequent algorithms (e.g. the lumen outer boundary segmentation algorithm) using the centerline as an initialization are sufficiently robust.

FIG. 2A shows an axial section of blood vessel 12 along slice plane II-II. In addition to the already mentioned components lumen 14 and wall 16, along with their lumen outer boundary 14a and wall outer boundary 16a, different anatomical structures are represented within the region bounded by the lumen outer boundary 14a and the wall outer boundary 16a. These anatomical structures are calcifications 17, a thrombus 18, and plaques 19. Centerline 24 is represented as a cross in dot-and-dash-style. It can be assumed to be located near the center of gravity of the lumen outer boundary 14a. This FIG. 2A represents an initial state of the three-dimensional representation of the blood vessel 12. Centerline 24 has been calculated already.

A next state of the three-dimensional representation of blood vessel 12 is shown in FIG. 2B. An initial tube-like three-dimensional Active Object (3DAO) 26a is placed along the centerline. 3D Active Objects, sometimes also called 3D Deformable Models, are a technique for fitting surfaces to volumetric data. They are termed "physically based" since they are formulated in terms of lagrangian equations of motion and thus can be made dynamic to realistically simulate the behavior of physical objects. The surface is discretized using finite elements and the fitting of the surface to the data is accomplished through the minimalization of an energy functional describing the deformation energy of the surface. 3D Deformable Models have been applied to the segmentation of medical images volumes by placing a closed surface inside a region to be segmented and applying image forces to the surface on the basis of gradient information contained in the intensity distribution, allowing the surface to expand and conform to the region of interest. These types of models have the desirable properties of being able to assume complex free-form shapes and having an intuitive means of fitting the data by considering each data point as a user-applied point force on the surface. In FIG. 2B, the polygon 26a represents a cross-section through a tube-like 3DAO placed along the centerline 24. The initial 3DAO is automatically deformed to the boundary of the lumen.

FIG. 2C shows the result of the automatic deformation of the lumen 3DAO 26b, which closely approximates the lumen outer boundary 14a delineating the lumen 14 against the wall 16, calcifications 17, thrombus 18, and plaques 19. The final lumen 3DAO 26b is represented as a polygon having only eight vertices for reasons of clarity. In reality, much smaller vertices are used, so that the lumen boundary is accurately delineated. The cross-section of lumen 3DAO 26b could have an arbitrary geometrical shape, having in particular more vertices to approximate the lumen boundary more closely. Moreover, the cross-section of the lumen 3DAO 26b is not necessarily constant along its longitudinal axis, but may vary as the lumen boundary varies.

Referring now to FIG. 2D, the replacement of pixel intensities within a specified volume around the lumen is represented. Once the final lumen 3DAO 26b has been determined, the method assumes a high probability that the wall outer boundary of the blood vessel will be encountered within a certain distance from the lumen 3DAO 26b. The distance from the lumen 3DAO 26b up to which the presence of the blood vessel wall is assumed by the wall outer boundary segmenting method is depicted as an ellipse shown as a dashed line in FIG. 2D. Calcifications 17, a thrombus 18, and plaques 19 are contained in the ring defined by the lumen 3DAO 26b and the dashed ellipse marking the maximum distance from the segmented lumen. Within this ring, objects are assigned intensity values that are equal or close to the intensity values of the wall 16, which is implied by the same shade of grey in FIG. 2D. Furthermore the lumen 3DAO 26b is used to initialized a wall outer boundary 3DAO 28. This wall outer boundary 3DAO 28 is deformed in a similar manner as described above. However, the deformation process is possibly being governed by a different stop criterion, if need be.

The final result of the deformation applied to the outer boundary 3DAO 28 is depicted in FIG. 2E. The wall outer boundary 3DAO 28, hatched along its contour only for reasons of clarity, now closely follows the contour of the outer boundary 16a of wall 16. Furthermore, calcifications 17, the thrombus 18, and plaques 19 have been restored with their original pixel intensities, implied by the differing shades of grey corresponding to those in FIGS. 2A-2C. Their segmentation can now be achieved by applying a segmentation algorithm to the volume of interest, which is delimited by the lumen 3DAO 26b and the wall outer boundary 3DAO 28. This segmentation algorithm for the anatomical structures in the region of the blood vessel between lumen 3DAO 26b and the outer boundary 3DAO may be chosen and parameterized so as to perform a rather meticulous, or pedantic, segmentation. This is possible because the evaluation volume is limited. Furthermore, the pixel intensities within the limited volume of interest are distinctive for a certain anatomical structure, such as healthy wall 16, calcifications 17, thrombus 18, and plaques 19. Therefore, several clusters of intensity values in an intensity histogram may be expected to occur, with each cluster referring to the intensity values caused by a certain anatomical structure.

Figure 3:
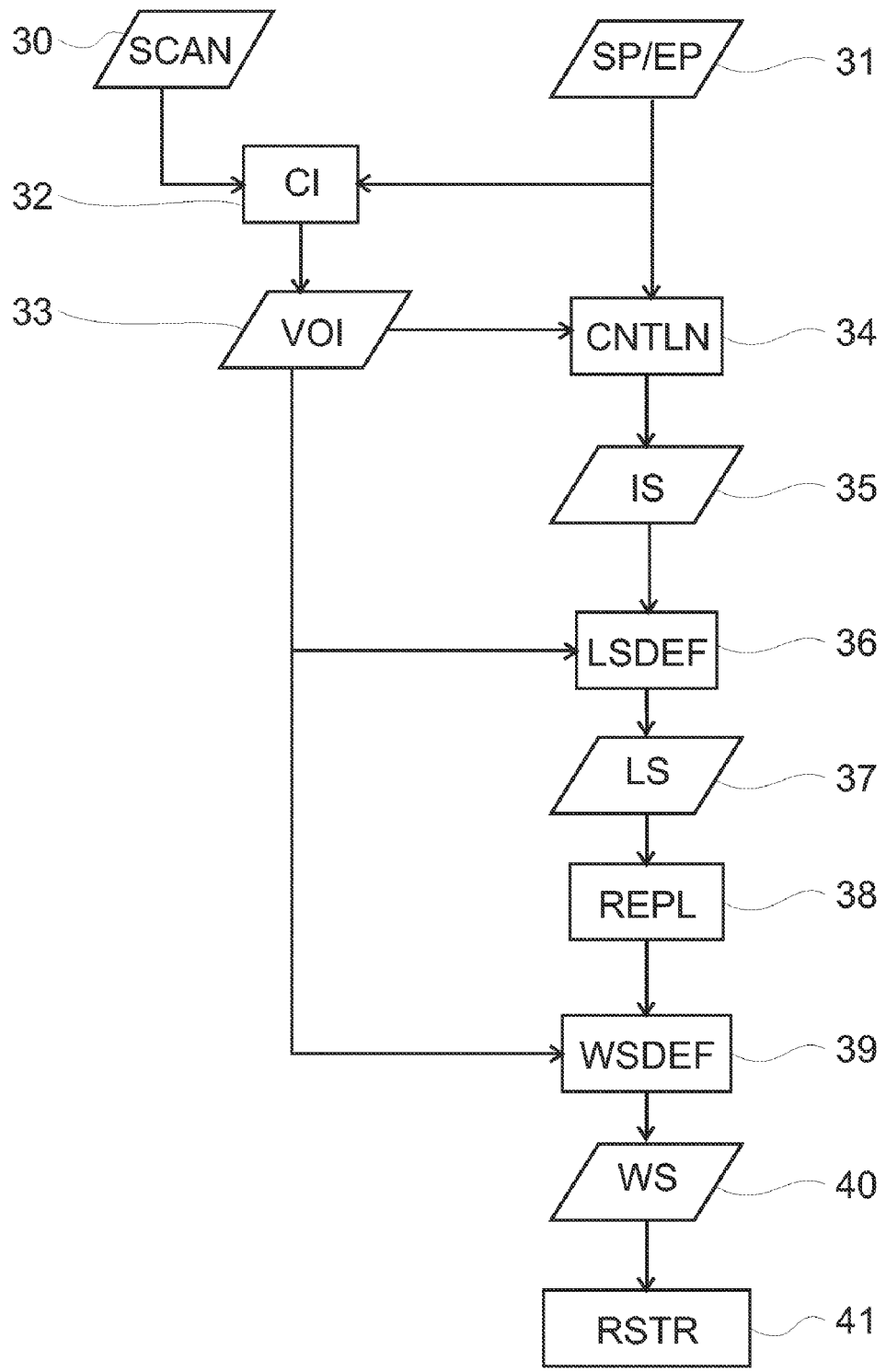
FIG. 3 is a flowchart representing steps of a method according to the present invention.

FIG. 3 is a flowchart of a method according to the invention. Rhomboids represent data that is either an input to the method or an intermediate result. Rectangles represent operations performed on the data. One of the inputs of the method is a data set 30 (SCAN) that contains a three-dimensional representation of a part of a body, e.g. the abdomen. This data set can be obtained either directly from an appropriate acquisition device, such as a Computed Tomography Angiograph, or reproduced from a digital storage device. In any event the data set contains a three-dimensional spatial distribution of intensities of the abdomen, for example, wherein these intensities reflect a certain physical property of a certain location within the body. A common physical property is the so-called Hounsfield value, which describes the absorption coefficient of the body at a certain location with respect to electromagnetic radiation in the X-ray range. Other physical properties may be detected by magnetic resonance imaging (MRI). Another input for the method is a start point and an end point 31 (SP/EP) on a blood vessel, which determines the region that is to be considered for the segmentation. The start point and the end point may be user selected or determined automatically. These inputs, i.e. the three-dimensional data set 30 and the start point/end point selection 31 are processed by a chunk image generator (CI) 32, which defines a volume of interest (VOI) 33. The volume of interest 33 is usually a subset of the three-dimensional data set 30, so that unnecessary operations on parts of the data set that are of no or little interest are avoided. The volume of interest acts as an input parameter to several evaluation algorithms. One of these evaluation algorithms is the centerline determination 34 (CNTLN) between a start point and an end point 31. The determination of the centerline is based, for example, on the determination of the centers of gravity of subsequent cross-sections through the lumen. Connecting the centers of gravity then yields the centerline. It is also possible to determine the centerline as a least-cost route from the start point to the end point. Once the centerline has been determined, it is used as an initial guess for an initial surface 35 (IS) from which a 3D Active Object is to be developed by deformation. Experiments have shown that a tube-like initial surface 35 having a circular cross-section of constant radius r=5 mm yields good results. The deformation of this initial surface 37 is performed by a lumen surface deformation algorithm 36 (LSDEF). Such an algorithm may be, for example, threshold-based, which means that the vertex of the 3DAO is pushed outwards (i.e. according to a normal vector of the 3DAO at the locations of the considered vertex) as long as the intensity value at the vertex indicates that the vertex is still situated inside the lumen. This can be achieved by applying lower and upper thresholds defining the intensity interval of a typical vessel inside the lumen. As soon as the intensity value encountered at the vertex is outside this intensity interval, the vertex is pushed inside again. The algorithm also implements a stop criterion to indicate when the deformed surface sufficiently resembles the actual lumen of the blood vessel. The 3DAO eventually retained as the representation of the lumen is called the lumen surface 37 (LS). In a next step of the method, the region around the determined lumen surface 37 is modified in that intensity values that most probably do not refer to a healthy blood vessel wall are replaced with intensity values that correspond to those of a healthy blood vessel wall. This replacement step 38 (REPL) is carried out in a region around the lumen surface 37 having the approximate shape of a hollow cylinder along the centerline. The effective distance of this replacement action depends on the size and the state of health of the blood vessel. It has been found that a radius of 5 cm yields good results for an abdominal aorta possibly affected with an aneurysm. The next step is performed to find the surface of the outer boundary of the blood vessel wall. It is therefore called wall surface deformation step 39 (WS-DEF). A wall surface 3DAO is initialized with the lumen surface 3DAO found in step 37. Wall segmentation, however, is a complex problem, and a deformable model of simple forces based on image intensity thresholds would not provide sufficiently better results. Instead, a pattern classification approach is used for grey value modeling, namely the k-nearest neighbors (KNN) algorithm. In this supervised learning technique, the arbitrary probability density functions for each class are estimated by dividing the feature space into cells of variable size. A cell corresponds to the k "neighbors" (or closest training points) of a given feature point. The posterior probability of the feature point belonging to a given class is determined by the density of training points in the cell:

$$P(\Omega_j | y) = \frac{k_j}{k}.$$

In this formula, $k_j$ is the number of points belonging to class $\Omega_j$ among the k (spatially) nearest neighbors of the given feature point y. The point is then assigned to the class with highest probability. Possible classes $\Omega_j$ include "inside the object" (i.e. within the outer boundary of the wall), "outside the object" and at the "object boundary". According to the result of the k-nearest neighbor classification, a vertex is either pushed outwards in case of a classification as "inside the object", pushed inwards in case of a classification as "outside the object", or maintained at its current location in case of a classification as "object boundary". In this algorithm, the stop criterion is met, if all, or at least a majority, of the vertices are located on the object boundary. The previous replacement step 38 reports the wall surface deformation to step 39 in that no disturbing anatomical structures influence the classification of a vertex. The final result of the wall surface deformation step 39 is written to a wall surface data structure 40 (WS), which is a 3D Active Object. In a subsequent restoration step 41 (RSTR), the intensity replacements that have been performed during replacement step 38 are revoked. This restores the original intensity values so that a segmentation of the blood vessel wall and the anatomical structures contained therein can be performed.

Besides the described application of the method and the Computer Program Product for segmenting a blood vessel, other applications in medical imaging may be considered.

The invention may be applied to the segmentation of brain tissue in a 3D scan in order to separate lesions such as tumors in the brain. Healthy brain tissue usually has a rather uniform pixel intensity/Hounsfield value. Lesions, however, may have a different value. Segmentation of the healthy brain tissue, e.g. using 3D Active Objects and/or deformable models, may be less optimal when the lesions are not temporarily replaced by an intensity similar to that of healthy brain tissue. In the brain, the boundary for replacement could be the skull (which has a very high intensity and is therefore easily detected).

Liver segmentation is another application of the present invention. Replacement of intensity values is performed on presumptive lesions (tumors) in the liver before segmentation of the complete liver from a 3D abdominal CT. As liver tissue is rather uniform in a CT representation, lesions may have a different intensity and/or Hounsfield value. However, defining the boundary for the intensity replacement may be a bit more difficult for the liver.

The method and the Computer Program Product according to the invention may also be applied to several smaller organs in the body. Furthermore, it is conceivable to use the invention in a method for segmenting CT angiography scans of organs including the internal blood vessel. In a first step, the lumens of the blood vessels themselves can be segmented, which is fairly easily done by thresholding. The detected lumen can then be replaced by e.g. the mean value of the surrounding tissue, and the complete organs can be segmented with more advanced techniques such as 3D Active Objects.

Although the present invention has been described with reference to a preferred embodiment, it is not to be limited to the particular construction disclose and/or shown in the drawings, but also comprises any modifications or equivalents within the scope of the claims.

As is known in the art, the method can be performed using a workstation arranged to receive image data from a medical imaging and arranged to perform the method. An advantageous manner in which the invention may be worked includes the installation of the computer program product on the workstation for the performance of the method.

The invention claimed is:

1. A method of segmenting a three-dimensional digital representation of an anatomical structure, comprising:
   segmenting an outer boundary of said anatomical structure by
      temporarily replacing, prior to said segmentation of said outer boundary and in a specified volume, intensity values significantly deviating from those of said anatomical structure with a substitute intensity value representative of said anatomical structure; and
      restoring said significantly deviating intensity values once said segmentation of said outer boundary is complete.

2. The method according to claim 1, further comprising: determining said specified volume by determining an envelope of said anatomical structure.

3. The method according to any of claim 1, wherein said specified volume is determined by a boundary layer surrounding said anatomical structure.

4. The method according to claim 1, wherein said substitute intensity value is automatically obtained through evaluation of intensity statistics in said specified volume.

5. The method according to claim 1, wherein, subsequent to said restoration, lesions in the specified volume are individually segmented.

6. A non-transitory computer readable storage medium encoded with computer executable instructions for segmenting a three-dimensional digital representation of an anatomical structure that when executed by a processor cause the processor to:
   segment of an outer boundary of said anatomical structure by
      temporary replacement, prior to said segmentation of said outer boundary and in a specified volume, of intensity values significantly deviating from those of said anatomical structure with a substitute intensity value representative of said anatomical structure; and restoration of said significantly deviating intensity values once said segmentation of said outer boundary is complete.

7. The computer-readable storage medium of claim 6, the instructions, when executed by the processor, further cause the processor to: determine said specified volume by determining an envelope of said anatomical structure.

8. The computer-readable storage medium of claim 6, wherein said specified volume is determined by a boundary layer surrounding said anatomical structure.

9. The computer-readable storage medium of claim 6, wherein said substitute intensity value is automatically obtained through evaluation of intensity statistics in said specified volume.

10. The computer-readable storage medium of claim 6, wherein, subsequent to said restoration, lesions in the specified volume are individually segmented.

11. A workstation arranged to provide segmentation of a three-dimensional digital representation of an anatomical structure, comprising:

a processor that segments an outer boundary of said anatomical structure by temporary replacement, prior to said segmentation of said outer boundary and in a specified volume, of intensity values significantly deviating from those of said anatomical structure with a substitute intensity value representative for said anatomical structure and restoration of said significantly deviating intensity values once said segmentation of said outer boundary is complete.

12. The workstation according to claim 11, wherein the processor determines said specified volume by determining an envelope of said anatomical structure.

13. The workstation according to any of claim 11, wherein said specified volume is determined by a boundary layer surrounding said anatomical structure.

14. The workstation according to claim 11, wherein said substitute intensity value is automatically obtained through evaluation of intensity statistics in said specified volume.

15. The workstation according to claim 11, wherein, subsequent to said restoration, lesions in the specified volume are individually segmented.

* * * * *